(12) United States Patent
Park et al.

(10) Patent No.: US 11,312,832 B2
(45) Date of Patent: Apr. 26, 2022

(54) THERMOPLASTIC RESIN COMPOSITION FOR LASER DIRECT STRUCTURING PROCESS AND ARTICLE COMPRISING THE SAME

(71) Applicant: Lotte Advanced Materials Co., Ltd., Yeosu-si (KR)

(72) Inventors: Jee Kwon Park, Uiwang-si (KR); Ik Mo Kim, Uiwang-si (KR); Nam Hyun Kim, Uiwang-si (KR); Jung Ki Kim, Uiwang-si (KR); Sang Hyun Hong, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 705 days.

(21) Appl. No.: 16/215,757

(22) Filed: Dec. 11, 2018

(65) Prior Publication Data
US 2019/0177499 A1    Jun. 13, 2019

(30) Foreign Application Priority Data

Dec. 12, 2017 (KR) .................. 10-2017-0170368
Oct. 1, 2018 (KR) .................. 10-2018-0117233

(51) Int. Cl.
| | |
|---|---|
| C08G 64/06 | (2006.01) |
| C08J 7/12 | (2006.01) |
| C08L 69/00 | (2006.01) |
| C08K 3/32 | (2006.01) |
| C08K 5/103 | (2006.01) |
| C08K 5/50 | (2006.01) |
| C08K 3/22 | (2006.01) |
| C08K 3/40 | (2006.01) |
| C08K 7/14 | (2006.01) |
| C08K 5/42 | (2006.01) |
| C08K 13/02 | (2006.01) |
| C08K 5/134 | (2006.01) |
| C08K 5/526 | (2006.01) |

(52) U.S. Cl.
CPC .............. *C08J 7/123* (2013.01); *C08G 64/06* (2013.01); *C08K 3/22* (2013.01); *C08K 3/32* (2013.01); *C08K 3/40* (2013.01); *C08K 5/103* (2013.01); *C08K 5/134* (2013.01); *C08K 5/42* (2013.01); *C08K 5/50* (2013.01); *C08K 5/526* (2013.01); *C08K 7/14* (2013.01); *C08K 13/02* (2013.01); *C08L 69/00* (2013.01); *C08K 2003/222* (2013.01); *C08K 2003/324* (2013.01); *C08K 2003/328* (2013.01); *C08L 2201/08* (2013.01)

(58) Field of Classification Search
USPC .......................... 528/271, 272, 274; 428/457
See application file for complete search history.

(56) References Cited

U.S. PATENT DOCUMENTS

| | | |
|---|---|---|
| 8,309,640 B2 | 11/2012 | Li et al. |
| 2009/0292048 A1 | 11/2009 | Li et al. |

FOREIGN PATENT DOCUMENTS

| | | |
|---|---|---|
| KR | 10-2011-0009684 A1 | 1/2011 |
| KR | 2011-0018319 A | 2/2011 |

OTHER PUBLICATIONS

Office Action in counterpart Korean Application No. 10-2018-0117233 dated Aug. 6, 2020, pp. 1-4.

*Primary Examiner* — Terressa Boykin
(74) *Attorney, Agent, or Firm* — Additon, Pendleton & Witherspoon, P.A.

(57) ABSTRACT

A thermoplastic resin composition and a molded article including the same. The thermoplastic resin composition includes: about 100 parts by weight of a thermoplastic resin; about 1 to about 30 parts by weight of an additive for laser direct structuring (LDS additive); about 0.01 to about 5 parts by weight of a hindered phenol-based compound; about 0.01 to about 10 parts by weight of a sodium phosphate salt; about 0.01 to about 5 parts by weight of a phosphite compound; about 0.01 to about 5 parts by weight of a sulfonate compound; and about 0.01 to about 10 parts by weight of a metal oxide, wherein a weight ratio of the hindered phenol-based compound, the sodium phosphate salt, the phosphite compound and the sulfonate compound to the metal oxide may range from about 2:1 to about 10:1. The thermoplastic resin composition has good properties in terms of plating reliability and thermal stability (discoloration resistance) and can secure good injection molding stability by suppressing gas generation upon injection molding.

10 Claims, 1 Drawing Sheet

THERMOPLASTIC RESIN COMPOSITION FOR LASER DIRECT STRUCTURING PROCESS AND ARTICLE COMPRISING THE SAME

CROSS-REFERENCE TO RELATED APPLICATION

This application claims priority, under 35 USC Section 119, to and the benefit of Korean Patent Application No. 10-2017-0170368, filed Dec. 12, 2017, and Korean Patent Application No. 10-2018-0117233, filed Oct. 1, 2018, the entire disclosures of each of which are incorporated herein by reference.

FIELD

The present disclosure relates to a thermoplastic resin composition for laser direct structuring and a molded article including the same.

BACKGROUND

Laser direct structuring (LDS) may be employed to plate a metal layer on at least a portion of a surface of a molded article formed of a thermoplastic resin composition. LDS is a process performed prior to plating, wherein a region of the surface of the molded article to be plated is irradiated with laser beams to modify the region to have suitable properties for plating. For this purpose, a thermoplastic resin composition used in the manufacture of a molded article is required to include an additive for LDS, which can form metal nuclei upon irradiation with laser beams. Upon receiving laser beams, the additive is decomposed to form metal nuclei. In addition, a surface of the molded article having been irradiated with laser beams becomes rougher. Due to the presence of the metal nuclei and surface roughness, the laser beam-modified region can become suitable for plating.

LDS allows rapid and efficient formation of electric/electronic circuits on a three-dimensional molded article. For example, LDS may be utilized in the manufacture of antennas for portable electronic devices, radio frequency identification (RFID) antennas, and the like.

Recently, with reduction in device weight and thickness, there is increasing demand for a thermoplastic resin composition having good mechanical properties and moldability (appearance characteristics). In addition, as the thickness of a micro-pattern (plating region) of an electric/electronic circuit of a portable electronic device and the like is reduced, a plating layer is more likely to be delaminated, thereby causing deterioration in plating reliability.

Moreover, typical additives for LDS deteriorate thermal stability by decomposing a thermoplastic resin composition at a processing temperature of the thermoplastic resin composition, thereby causing many problems, such as discoloration, gas generation, carbonization, and the like.

Therefore, there is a need for a thermoplastic resin composition for LDS, which can secure good properties in terms of plating reliability and thermal stability with minimal or no deterioration in mechanical properties, and can suppress gas generation upon injection molding, and a molded article including the same.

SUMMARY OF THE INVENTION

The present disclosure relates to a thermoplastic resin composition for laser direct structuring which can have good properties in terms of plating reliability and/or thermal stability (discoloration resistance) and can secure good injection molding stability by suppressing gas generation upon injection molding, and a molded article including the same.

The thermoplastic resin composition includes: about 100 parts by weight of a thermoplastic resin; about 1 to about 30 parts by weight of an additive for laser direct structuring (LDS additive); about 0.01 to about 5 parts by weight of a hindered phenol-based compound; about 0.01 to about 10 parts by weight of a sodium phosphate salt; about 0.01 to about 5 parts by weight of a phosphite compound; about 0.01 to about 5 parts by weight of a sulfonate compound; and about 0.01 to about 10 parts by weight of a metal oxide, wherein a weight ratio of the hindered phenol-based compound, the sodium phosphate salt, the phosphite compound and the sulfonate compound to the metal oxide may range from about 2:1 to about 10:1.

The thermoplastic resin may include a polycarbonate resin, a rubber-modified aromatic vinyl-based resin, a polyester resin, a polyamide resin and/or a polyarylene ether resin.

The LDS additive may include a heavy metal composite oxide spinel and/or a copper salt.

The metal oxide may include magnesium oxide, zinc oxide, calcium oxide, and/or aluminum oxide.

The thermoplastic resin composition may further include inorganic fillers.

The inorganic fillers may include glass fibers, talc, wollastonite, whisker, silica, mica, and/or basalt fibers.

The thermoplastic resin composition may have about 90 grid-lattices or more to remain without being peeled off when a tape is attached to and is then detached from an injection-molded specimen having a size of 50 mm×90 mm×3.2 mm after aging the specimen at 25° C. for 6 hours, activating a surface of the specimen in stripe form through laser direct structuring, forming a 35 µm thick copper layer on the activated surface of the specimen through plating (copper electroless plating), leaving the specimen in a chamber under conditions of 85° C. and 85% relative humidity (RH) for 72 hours, and carving 100 grid-lattices each having a size of 1 mm×1 mm on the plating layer (copper layer).

The thermoplastic resin composition may have a color variation (ΔE) of about 4 or less, as calculated according to Equation 1:

$$\text{Color variation } (\Delta E) = \sqrt{(\Delta L^*)^2 + (\Delta a^*)^2 + (\Delta b^*)^2} \quad [\text{Equation 1}]$$

wherein, $\Delta L^*$ is a difference ($L_1^* - L_0^*$) between $L^*$ values before/after exposure; $\Delta a^*$ is a difference ($a_1^* - a_0^*$) between $a^*$ values before/after exposure; and $\Delta b^*$ is a difference ($b_1^* - b_0^*$) between $b^*$ values before/after exposure, in which $L_0^*$, $a_0^*$ and $b_0^*$ are initial color values, as measured on an injection molded specimen having a size of 50 mm×90 mm×3.2 mm using a color difference meter, and $L_1^*$, $a_1^*$ and $b_1^*$ are color values, as measured on the specimen by the same method after exposure under conditions of 280° C. for 10 minutes.

The present disclosure also relates to a molded article formed of the thermoplastic resin composition as set forth above.

The molded article may include a metal layer formed on at least a portion of a surface thereof through laser direct structuring and plating.

DETAILED DESCRIPTION

The above and other aspects, features, and advantages of the present invention will become apparent from the detailed description of the following embodiments. It should be understood that the present invention is not limited to the following embodiments and may be embodied in different ways by those skilled in the art without departing from the scope of the present invention. Rather, the embodiments are provided for complete disclosure and to provide thorough understanding of the present invention by those skilled in the art. The scope of the present invention should be defined only by the appended claims.

A thermoplastic resin composition according to the present invention can be used in a laser direct structuring (LDS) process and includes: (A) a thermoplastic resin; (B) an LDS additive; (C) a hindered phenol-based compound; (D) a sodium phosphate salt; (E) a phosphite compound; (F) a sulfonate compound; and (G) a metal oxide.

(A) Thermoplastic Resin

The thermoplastic resin according to embodiments may be a thermoplastic resin used in a resin composition for a typical LDS process. Examples of the thermoplastic resin can include without limitation a polycarbonate resin, a rubber-modified aromatic vinyl-based resin, a polyester resin, a polyamide resin, and/or a polyarylene ether resin. In some embodiments, the thermoplastic resin may be a polycarbonate resin; a blend of a polycarbonate resin and a rubber-modified aromatic vinyl-based resin; and/or a blend of a polycarbonate resin and a polyester resin.

(A1) Polycarbonate Resin

The polycarbonate resin may be a polycarbonate resin used in a typical thermoplastic resin composition. For example, the polycarbonate resin may be an aromatic polycarbonate resin prepared by reacting a diphenol(s) (aromatic diol compounds) with a precursor, such as phosgene, halogen formate, and/or carbonate diester.

Examples of the diphenols may include 4,4'-biphenol, 2,2-bis(4-hydroxyphenyl)propane, 2,4-bis(4-hydroxyphenyl)-2-methylbutane, 1,1-bis(4-hydroxyphenyl)cyclohexane, 2,2-bis(3-methyl-4-hydroxyphenyl)propane, 2,2-bis(3,5-dimethyl-4-hydroxyphenyl)propane, 2,2-bis(3-chloro-4-hydroxyphenyl)propane, and/or 2,2-bis(3,5-dichloro-4-hydroxyphenyl)propane, without being limited thereto. For example, the diphenols may be 2,2-bis(4-hydroxyphenyl)propane, 2,2-bis(3-methyl-4-hydroxyphenyl)propane, 2,2-bis(3,5-dimethyl-4-hydroxyphenyl)propane, 2,2-bis(3,5-dichloro-4-hydroxyphenyl)propane, and/or 1,1-bis(4-hydroxyphenyl)cyclohexane, for example, 2,2-bis(4-hydroxyphenyl)propane.

The polycarbonate resin may be a branched polycarbonate resin. The branched polycarbonate resin may be prepared by adding a tri- or higher polyfunctional compound, for example, a tri- or higher valent phenol group-containing compound, in an amount of about 0.05 mol % to about 2 mol % based on the total number of moles of the diphenols used in polymerization.

The polycarbonate resin may be a homopolycarbonate resin, a copolycarbonate resin, or a blend thereof.

In addition, the polycarbonate resin may be partly or completely replaced by an aromatic polyester-carbonate resin obtained by polymerization in the presence of an ester precursor, for example, a bifunctional carboxylic acid.

The polycarbonate resin may have a weight average molecular weight (Mw) of about 10,000 g/mol to about 200,000 g/mol, for example, about 15,000 g/mol to about 80,000 g/mol, as measured by gel permeation chromatography (GPC).

(A2) Rubber-Modified Aromatic Vinyl-Based Resin

The rubber-modified aromatic vinyl-based resin may include (a1) about 10 to about 50 wt % of a graft copolymer, in which an aromatic vinyl monomer and a monomer copolymerizable with the aromatic vinyl monomer are grafted to a rubber polymer; and (a2) about 50 to about 90 wt % of an aromatic vinyl copolymer, in which an aromatic vinyl monomer is copolymerized with a monomer copolymerizable with the aromatic vinyl monomer.

In some embodiments, the rubber-modified aromatic vinyl-based resin can include the graft copolymer (a1) in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt % based on the total weight (100 wt %) of the rubber-modified aromatic vinyl-based resin. Further, according to some embodiments, the graft copolymer (a1) may be present in an amount of from about any of the foregoing amounts to about any other of the foregoing amounts.

In some embodiments, the rubber-modified aromatic vinyl-based resin can include the aromatic vinyl copolymer (a2) in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt % based on the total weight (100 wt %) of the rubber-modified aromatic vinyl-based resin. Further, according to some embodiments, the aromatic vinyl copolymer (a2) may be present in an amount of from about any of the foregoing amounts to about any other of the foregoing amounts.

The graft copolymer (a1) may be prepared by adding the aromatic vinyl monomer and the monomer copolymerizable with the aromatic vinyl monomer to the rubber polymer, followed by graft copolymerization, and the aromatic vinyl copolymer (a2) may be prepared by adding the aromatic vinyl monomer and the monomer copolymerizable with the aromatic vinyl monomer, followed by copolymerization. Herein, the copolymerization may be realized by any suitable polymerization method known in the art, such as emulsion polymerization, suspension polymerization, and mass polymerization. In mass polymerization, a rubber-modified aromatic vinyl-based resin, in which the graft copolymer (a1) is dispersed in the aromatic vinyl copolymer (a2) acting as a matrix, can be prepared through a single-step process without separate preparation of the graft copolymer (a1) and the aromatic vinyl copolymer (a2). Here, the rubber polymer may be present in an amount of about 5 wt % to about 40 wt % in a final rubber-modified aromatic vinyl-based resin. In some embodiments, the final rubber-modified aromatic vinyl-based resin can include the rubber polymer in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt % based on the total weight (100 wt %) of the rubber-modified aromatic vinyl-based resin. Further, according to some embodiments, the rubber polymer may be present in an amount of from about any of the foregoing amounts to about any other of the foregoing amounts.

The rubber polymer may have an average (Z-average) particle size of about 0.05 μm to about 6 μm. As used herein, the average (z-average) particle size can be measured by a dry method known in the art using a Mastersizer 2000E series tester (Malvern). Within this range, the thermoplastic resin composition can have good properties in terms of impact resistance and/or appearance.

Examples of the rubber-modified aromatic vinyl-based resin may include without limitation an acrylonitrile-butadiene-styrene copolymer resin (ABS resin), an acrylonitrile-ethylene propylene-styrene copolymer resin (AES resin), an acrylonitrile-acryl rubber-styrene copolymer resin (AAS resin), and the like, and combinations thereof, which are provided in the form of a mixture of the graft copolymer (a1), such as a g-ABS copolymer obtained through graft copolymerization of styrene corresponding to the aromatic vinyl monomer and acrylonitrile corresponding to a nitrile monomer copolymerizable with the styrene to a butadiene rubber polymer, and the aromatic vinyl copolymer (a2), such as a styrene-acrylonitrile (SAN) copolymer, obtained through copolymerization of styrene and acrylonitrile.

In exemplary embodiments, the thermoplastic resin can be a combination (bend) of the polycarbonate resin and the rubber-modified aromatic vinyl-based resin. When the thermoplastic resin includes a combination (blend) of the polycarbonate resin and the rubber-modified aromatic vinyl-based resin, the polycarbonate resin may be present in an amount of about 50 wt % or more, for example, about 60 wt % to about 95 wt %, based on 100 wt % of the thermoplastic resin, and the rubber-modified aromatic vinyl-based resin may be present in an amount of about 50 wt % or less, for example, about 5 wt % to about 40 wt %, based on 100 wt % of the thermoplastic resin.

When the thermoplastic resin includes a combination (blend) of the polycarbonate resin and the rubber-modified aromatic vinyl-based resin, the thermoplastic resin may include the polycarbonate resin in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt % based on the total weight (100 wt %) of the thermoplastic resin. Further, according to some embodiments, the polycarbonate resin may be present in an amount of from about any of the foregoing amounts to about any other of the foregoing amounts.

When the thermoplastic resin includes a combination (blend) of the polycarbonate resin and the rubber-modified aromatic vinyl-based resin, the thermoplastic resin may include the rubber-modified aromatic vinyl-based resin in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt % based on the total weight (100 wt %) of the thermoplastic resin. Further, according to some embodiments, the rubber-modified aromatic vinyl-based resin may be present in an amount of from about any of the foregoing amounts to about any other of the foregoing amounts.

Within the above ranges, the thermoplastic resin composition can have good impact resistance and/or mechanical properties.

(A3) Polyester Resin

The polyester resin may be a glycol-modified polyester resin. For example, the polyester resin may be a glycol-modified polyester resin having a 1,4-cyclohexanedimethanol (CHDM) content of about 20 mol % to 100 mol % in a diol component. Within this range, the polyester resin can improve plating reliability and moldability of the thermoplastic resin composition while maintaining rigidity thereof.

In exemplary embodiments, the glycol-modified polyester resin may be prepared by polycondensation of a dicarboxylic acid component including terephthalic acid with a diol component including about 20 mol % to 100 mol %, for example, about 35 mol % to 100 mol %, of 1,4-cyclohexanedimethanol (CHDM) and 0 wt % to about 80 wt %, for example, 0 wt % to about 65 wt %, of $C_2$ to $C_6$ alkylene glycol. Within this range, the thermoplastic resin composition can exhibit good properties in terms of plating reliability and/or moldability.

In some embodiments, the diol component of the glycol-modified polyester resin may include a CHDM derived unit in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 mol % based on 100 mol % of the diol component. Further, according to some embodiments, the CHDM derived unit may be present in an amount of from about any of the foregoing amounts to about any other of the foregoing amounts.

In some embodiments, the diol component of the glycol-modified polyester resin may include a repeat unit derived from a diol other than CHDM, for example a $C_2$ to $C_6$ alkylene glycol, in an amount of 0 (the other diol is not present), about 0 (the other diol is present), 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 mol % based on 100 mol % of the diol component. Further, according to some embodiments, the other diol derived unit may be present in an amount of from about any of the foregoing amounts to about any other of the foregoing amounts.

The glycol-modified polyester resin may have an intrinsic viscosity of about 0.5 dl/g to about 0.8 dl/g, for example, about 0.55 dl/g to about 0.75 dl/g, as measured at 35° C. in an o-chlorophenol solution (concentration: 0.5 g/dl). Within this range, compatibility between the components of the thermoplastic resin composition can be improved and the thermoplastic resin composition can have good mechanical properties, moldability (appearance characteristics), and/or surface hardness.

In exemplary embodiments, the thermoplastic resin can be a combination (bend) of the polycarbonate resin and the polyester resin. When the thermoplastic resin is a combination (blend) of the polycarbonate resin and the polyester resin, the polycarbonate resin may be present in an amount of about 50 wt % or more, for example, about 60 wt % to about 95 wt %, based on 100 wt % of the thermoplastic resin, and the polyester resin may be present in an amount of about 50 wt % or less, for example, about 5 wt % to about 40 wt %, based on 100 wt % of the thermoplastic resin.

When the thermoplastic resin is a combination (blend) of the polycarbonate resin and the polyester resin, the thermoplastic resin can include the polycarbonate resin in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt % based on the total weight (100 wt %) of the thermoplastic resin. Further, according to some embodiments, the polycarbonate resin may be present in an amount of from about any of the foregoing amounts to about any other of the foregoing amounts.

When the thermoplastic resin is a combination (blend) of the polycarbonate resin and the polyester resin, the thermoplastic resin can include the polyester resin in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt % based on the total weight (100 wt %) of the thermoplastic resin. Further, according to some embodiments, the polyester resin may be present in an amount of from about any of the foregoing amounts to about any other of the foregoing amounts.

Within this range, the thermoplastic resin composition can have good properties in terms of mechanical properties, plating reliability, moldability, and the like.

(B) LDS Additive

The LDS additive serves to form metal nuclei upon irradiation with laser beams and may include any typical LDS additive used in resin compositions for LDS. Herein, the laser beams refer to light amplified through stimulated emission of radiation (stimulated emission light) and may be UV light having a wavelength of 100 nm to 400 nm, visible light having a wavelength of 400 nm to 800 nm, and/or IR light having a wavelength of 800 nm to 25,000 nm, for example, IR light having a wavelength of 1,000 nm to 2,000 nm.

The LDS additive may include a heavy metal composite oxide spinel and/or a copper salt.

The heavy metal composite oxide spinel may be represented by Formula 1:

$$AB_2O_4 \qquad \text{[Formula 1]}$$

wherein A is a metal cation having a valence of 2, for example, magnesium, copper, cobalt, zinc, tin, iron, manganese, nickel, and/or a combination thereof, and B is a metal cation having a valence of 3, for example, manganese, nickel, copper, cobalt, tin, titanium, iron, aluminum, chromium, and/or a combination thereof.

In the heavy metal composite oxide represented by Formula 1, A provides a monovalent cation component of a metal oxide cluster and B provides a monovalent cation component of a metal cation cluster. For example, the metal oxide cluster including A may have a tetrahedral structure and the metal oxide cluster including B may have an octahedral structure. The heavy metal complex oxide represented by Formula 1 may have a structure in which oxygen atoms are arranged in a cubic close-packed lattice, and B and A occupy octahedral and tetrahedral sites in the lattice, respectively.

Examples of the heavy metal composite oxide spinel may include without limitation magnesium aluminum oxide ($MgAl_2O_4$), zinc aluminum oxide ($ZnAl_2O_4$), iron aluminum oxide ($FeAl_2O_4$), copper iron oxide ($CuFe_2O_4$), copper chromium oxide ($CuCr_2O_4$), manganese iron oxide ($MnFe_2O_4$), nickel iron oxide ($NiFe_2O_4$), titanium iron oxide ($TiFe_2O_4$), iron chromium oxide ($FeCr_2O_4$), magnesium chromium oxide ($MgCr_2O_4$), and the like, and combinations thereof. For example, the heavy metal complex oxide may be copper chromium oxide ($CuCr_2O_4$). The copper chromium oxide ($CuCr_2O_4$) has a dark color and thus can be advantageous when a final molded product is required to be black or grey.

Examples of the copper salt may include without limitation copper hydroxide phosphate, copper phosphate, copper sulfate, cuprous thiocyanate, and the like, and combinations thereof. For example, the copper salt may be copper hydroxide phosphate. The copper hydroxide phosphate is a compound in which copper phosphate is combined with copper hydroxide, and may include $Cu_3(PO_4)_2 \cdot 2Cu(OH)_2$, $Cu_3(PO_4)_2 \cdot Cu(OH)_2$, and the like. The copper hydroxide phosphate does not affect color-reproduction properties of a colorant, as an additive, and thus allows a molded product having desired color to be easily obtained.

The LDS additive may have an average particle diameter of about 0.01 μm to about 50 μm, for example, about 0.1 μm to about 30 μm, and as another example about 0.5 μm to about 10 μm. Within this range, it is possible to form a uniform coating surface through laser direct structuring.

As used herein, unless otherwise stated, the term "average particle diameter" refers to D50 (a diameter at a distribution rate of 50%) which is a number average particle diameter.

The thermoplastic resin composition can include the LDS additive in an amount of about 1 to about 30 parts by weight, for example, about 5 to about 20 parts by weight, relative to about 100 parts by weight of the thermoplastic resin. In some embodiments, the thermoplastic resin composition can include the LDS additive in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 parts by weight based on about 100 parts by weight of the thermoplastic resin. Further, according to some embodiments, the LDS additive may be present in an amount of from about any of the foregoing amounts to about any other of the foregoing amounts.

If the content of the LDS additive is less than about 1 part by weight relative to about 100 parts by weight of the thermoplastic resin, a sufficient amount of metal nuclei may not be formed in the coating during irradiation of the thermoplastic resin composition (molded product) with laser beams, thereby causing deterioration in plating adhesion, and if the content of the LDS additive exceeds about 30 parts by weight, the thermoplastic resin composition can suffer from deterioration in impact resistance, thermal resistance, and the like.

(C) Hindered Phenol-Based Compound

The hindered phenol-based compound can suppress decomposition of the thermoplastic resin while improving thermal stability (discoloration resistance) of the thermoplastic resin composition and may be selected from hindered phenol-based compounds used for typical thermoplastic resin compositions.

Examples of the hindered phenol-based compound may include without limitation pentaerythritol tetrakis(3,5-di-t-butyl-4-hydroxy-hydrocinnamate), triethylene glycol-bis[3-(3-t-butyl-5-methyl-4-hydroxyphenyl)propionate, 4,4'-butylidenebis(3-methyl-6-t-butylphenol), 1,6-hexanediol-bis[3-(3,5-di-t-butyl-4-hydroxyphenyl)propionate, 2,4-bis-(n-octylthio)-6-(4-hydroxy-3,5-di-t-butylanylino)-1,3,5-triazine, pentaerythritol-tetrakis[3-(3,5-di-t-butyl-4-hydroxyphenyl)propionate], 2,2-thio-diethylenebis[3-(3,5-di-t-butyl-4-hydroxyphenyl)propionate], octadecyl-3-(3,5-di-t-butyl-4-hydroxyphenyl)propionate, 2,2-thiobis(4-methyl-6-1-butylphenol), N,N'-hexamethylenebis(3,5-di-t-butyl-4-hydroxy-hydroxycinnamide), 3,5-di-t-butyl-4-hydroxy-benzylphosphonate-diethylester, 1,3,5-trimethyl-2,4,6-tris(3,5-di-butyl-4-hydroxybenzyl)benzene, bis(3,5-di-t-butyl-4-hydroxybenzyl)sulfonic acid ethyl calcium, tris-(3,5-di-t-butyl-4-hydroxybenzyl)-isocyanurate, 2,6-di-t-butyl-p-cresol, butylated hydroxyanisole, 2,6-di-t-butyl-4-ethylphenol, stearyl-β-(3,5-di-t-butyl-4-hydroxyphenyl) propionate, 2,2'-methylenebis-(4-methyl-6-t-butylphenol), 2,2'-methylene-bis-(4-ethyl-6-t-butylphenol), 4,4'-thiobis-(3-methyl-6-t-butylphenol), octylated diphenylamine, 2,4-bis[(octylthio)methyl]-O-cresol, iso-octyl-3-(3,5-di-t-butyl-4-hydroxyphenyl)propionate, 4,4'-butylidenebis(3-methyl- 6-t-butylphenol, 3,9-bis[1,1-dimethyl-2-[13-(3-t-butyl-4-hydroxy-5-methylphenyl)propionyloxy]ethyl]-2,4,8,10-tetraoxaspiro[5,5]undecane, 1,1,3-tris(2-methyl-4-hydroxy-5-t-butylphenyl)butane, 1,3,5-trimethyl-2,4,6-tris(3,5-di-t-butyl-4-hydroxybenzyl)benzene, bis[3,3'-bis-(4'-hydroxy-3'-t-butylphenyl)butyric acid]glycol ester, 1,3,5-tris(3',5'-di-t-butyl-4'-hydroxybenzyl)-sec-triazine-2,4,6-(1H,3H,5H) trion, d-α-tocopherol, and the like, and combinations thereof. Examples of commercially available products of the hindered phenol-based compound may include without limitation Irganox® 1010 and/or Irganox® 1098 (BASF).

The thermoplastic resin composition can include the hindered phenol-based compound in an amount of about 0.01 to about 5 parts by weight, for example, about 0.1 to about 2 parts by weight, relative to about 100 parts by weight of the thermoplastic resin. In some embodiments, the thermoplastic resin composition can include the hindered phenol-based compound in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, or 5 parts by weight based on about 100 parts by weight of the thermoplastic resin. Further, according to some embodiments, the hindered phenol-based compound may be present in an amount of from about any of the foregoing amounts to about any other of the foregoing amounts.

If the content of the hindered phenol-based compound is less than about 0.01 parts by weight relative to about 100 parts by weight of the thermoplastic resin, the thermoplastic resin composition can suffer from deterioration in thermal stability, and if the content of the hindered phenol-based compound exceeds about 5 parts by weight relative to about 100 parts by weight of the thermoplastic resin, the thermoplastic resin composition can suffer from deterioration in rigidity and impact resistance.

(D) Sodium Phosphate Salt

The sodium phosphate salt can exhibit good moisture stability and/or thermal stability to suppress decomposition of the thermoplastic resin when exposed to high temperature/humidity conditions for a long period of time, while improving thermal resistance (discoloration resistance) of the thermoplastic resin composition.

Examples of the sodium phosphate salt may include without limitation disodium pyrophosphate, tetrasodium pyrophosphate, sodium tripolyphosphate, sodium hexametaphosphate, and the like, and combinations thereof.

The thermoplastic resin composition can include the sodium phosphate salt in an amount of about 0.01 to about 10 parts by weight, for example, 0.1 to 5 parts by weight, relative to about 100 parts by weight of the thermoplastic resin. In some embodiments, the thermoplastic resin composition can include the sodium phosphate salt in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, or 10 parts by weight based on about 100 parts by weight of the thermoplastic resin. Further, according to some embodiments, the sodium phosphate salt may be present in an amount of from about any of the foregoing amounts to about any other of the foregoing amounts.

If the content of the sodium phosphate salt is less than about 0.01 parts by weight relative to about 100 parts by weight of the thermoplastic resin, the thermoplastic resin composition can suffer from deterioration in thermal stability and/or heat resistance, and if the content of the sodium phosphate salt exceeds about 10 parts by weight, the thermoplastic resin composition can suffer from deterioration in rigidity and/or impact resistance.

(E) Phosphite Compound

The phosphite compound can serve to suppress decomposition of the thermoplastic resin while improving thermal resistance (discoloration resistance) of the thermoplastic resin composition, and may be selected from phosphite-based antioxidants used for typical thermoplastic resin compositions.

Examples of the phosphite compound may include without limitation triphenyl phosphite, trioctadecyl phosphite, tridecyl phosphite, trinonylphenyl phosphite, diphenylisodecyl phosphite, bis(2,6-di-tert-butyl-4-methylphenyl)pentaerythritol diphosphite, bis(2,4-di-tert-butylphenyl)pentaerythritol diphosphite, tris(2,4-di-tert-butylphenyl) phosphite, distearylpentaerythritol diphosphite, tetra(tridecyl-4,4'-isopropylidene diphenyl diphosphite, 2,2-methylenebis(4,6-di-tert-butylphenyl)octyl phosphite, and the like, and combinations thereof.

The thermoplastic resin composition can include the phosphite compound in an amount of about 0.01 to about 5 parts by weight, for example, about 0.1 to about 2 parts by weight, relative to about 100 parts by weight of the thermoplastic resin. In some embodiments, the thermoplastic resin composition can include the phosphite compound in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, or 5 parts by weight based on about 100 parts by weight of the thermoplastic resin. Further, according to some embodiments, the phosphite compound may be present in an amount of from about any of the foregoing amounts to about any other of the foregoing amounts.

If the content of the phosphite compound is less than about 0.01 parts by weight relative to about 100 parts by weight of the thermoplastic resin, the thermoplastic resin composition can suffer from deterioration in thermal stability and/or heat resistance, and if the content of the phosphite compound exceeds about 5 parts by weight, the thermoplastic resin composition can suffer from deterioration in rigidity and/or impact resistance.

(F) Sulfonate Compound

The sulfonate compound can serve to suppress decomposition of the thermoplastic resin while improving thermal resistance (discoloration resistance) of the thermoplastic resin composition, and may be selected from aromatic sulfonic acid metal salts used for typical thermoplastic resin compositions.

Examples of the sulfonate compound may include without limitation disodium diphenyl sulfide-4,4'-disulfonate, dipotassium diphenyl sulfide-4,4'-disulfonate, potassium 5-sulfo isophthalate, sodium 5-sulfo isophthalate, polysodium polyethylene terephthalate polysulfonate, calcium 1-methoxy naphthalene-4-sulfonate, disodium 4-dodecyl phenyl ether disulfonate, polysodium poly(2,6-dimethyl diphenyl oxide) polysulfonate, polysodium poly(1,3-phenylene oxide)polysulfonate, polysodium poly(1,4-phenylene oxide)polysulfonate, polypotassium poly(2,6-diphenyl phenylene oxide)polysulfonate, lithium poly(2-fluoro-6-butyl phenylene oxide)polysulfonate, potassium benzene sulfonate, sodium benzene sulfonate, strontium benzene sulfonate, magnesium benzene sulfonate, dipotassium p-benzene disulfonate, dipotassium naphthalene-2,6-disulfonate, calcium biphenyl-3,3'-disulfonate, sodium diphenyl sulfone-3-sulfonate, potassium diphenyl sulfone-3-sulfonate, dipotassium diphenyl sulfone-3,3'-disulfonate, dipotassium diphenyl sulfone-3,4'-disulfonate, dipotassium benzophenol-3,3'-disulfonate, disodium thiophene-2,4-disulfonate, dipotassium thiophene-2,5-disulfonate, calcium thiophene-2,5-disulfonate, sodium benzothiophene sulfonate, and the like. These may be used alone or as a mixture thereof. Among these compounds, potassium diphenyl sulfone-3-sulfonate can be used.

The thermoplastic resin composition can include the sulfonate compound in an amount of about 0.01 to about 5 parts by weight, for example, about 0.1 to about 2 parts by weight, relative to about 100 parts by weight of the thermoplastic resin. In some embodiments, the thermoplastic resin composition can include the sulfonate compound in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, or 5 parts by weight based on about 100 parts by weight of the thermoplastic resin. Further, according to some embodiments, the sulfonate compound may be present in an amount of from about any of the foregoing amounts to about any other of the foregoing amounts.

If the content of the sulfonate compound is less than about 0.01 parts by weight relative to about 100 parts by weight of the thermoplastic resin, the thermoplastic resin composition can suffer from deterioration in thermal stability and/or heat resistance, and if the content of the sulfonate compound exceeds about 5 parts by weight, the thermoplastic resin composition can suffer from deterioration in rigidity and/or impact resistance.

(G) Metal Oxide

The metal oxide can serve to suppress decomposition of the thermoplastic resin while improving thermal stability (discoloration resistance) of the thermoplastic resin composition together with the hindered phenol-based compound, the sodium phosphate salt, the phosphite compound and the sulfonate compound.

Examples of the metal oxide can include without limitation magnesium oxide (MgO), zinc oxide (ZnO), calcium oxide (CaO), aluminum oxide ($Al_2O_3$), and the like, and combinations thereof. For example, magnesium oxide (MgO) and/or zinc oxide (ZnO) may be used.

The thermoplastic resin composition can include the metal oxide in an amount of about 0.01 to about 10 parts by weight, for example, about 0.02 to about 2 parts by weight, relative to about 100 parts by weight of the thermoplastic resin. In some embodiments, the thermoplastic resin composition can include the metal oxide in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, or 10 parts by weight based on about 100 parts by weight of the thermoplastic resin. Further, according to some embodiments, the metal oxide may be present in an amount of from about any of the foregoing amounts to about any other of the foregoing amounts.

If the content of the metal oxide is less than about 0.01 parts by weight relative to about 100 parts by weight of the thermoplastic resin, the thermoplastic resin composition can suffer from deterioration in thermal stability and/or heat resistance, and if the content of the metal oxide exceeds about 10 parts by weight, the thermoplastic resin composition can suffer from deterioration in flowability and/or impact resistance.

In exemplary embodiments, a weight ratio ((C+D+E+F):(G)) of the hindered phenol-based compound, the sodium phosphate salt, the phosphite compound and the sulfonate compound (C, D, E, F) to the metal oxide (G) may range from about 2:1 to about 10:1, for example, about 3:1 to about 6:1. In some embodiments, the weight ratio ((C+D+E+F):(G)) of the hindered phenol-based compound, the sodium phosphate salt, the phosphite compound and the sulfonate compound (C, D, E, F) to the metal oxide (G) can be about 2:1, 3:1, 4:1, 5:1, 6:1, 7:1, 8:1, 9:1, or 10:1.

If the weight ratio is less than about 2:1, the thermoplastic resin composition can suffer from deterioration in flowability and/or impact resistance, and if the weight ratio exceeds about 10:1, the thermoplastic resin composition can suffer from deterioration in thermal stability.

In exemplary embodiments, the thermoplastic resin composition may further include inorganic fillers in order to improve mechanical properties and the like. The inorganic fillers may include any typical inorganic fillers other than the LDS additive and the components of the thermoplastic resin composition. Examples of the inorganic fillers may include without limitation glass fibers, talc, wollastonite, whisker, silica, mica, basalt fiber, and the like, and mixtures thereof. For example, the inorganic fillers may be glass fibers.

In exemplary embodiments, the inorganic fillers may be glass fibers having a circular cross-sectional shape and having an average diameter of about 5 μm to about 20 μm and an as-manufactured length of about 2 mm to about 5 mm, as measured on a cross-section thereof using an optical microscope, and/or glass fibers having a plate or elliptical cross-sectional shape and having a cross-sectional aspect ratio (major diameter/minor diameter) of about 1.5 to about 10 and an as-manufactured length of about 2 mm to about 5 mm. Within this range, the inorganic fillers can improve mechanical properties and/or surface hardness of the thermoplastic resin composition with minimal or no deterioration in other properties, such as appearance.

The thermoplastic resin composition can include the inorganic fillers in an amount of about 1 to about 40 parts by weight, for example, about 5 to about 30 parts by weight, relative to about 100 parts by weight of the thermoplastic resin. In some embodiments, the thermoplastic resin composition can include the inorganic fillers in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 parts by weight based on about 100 parts by weight of the thermoplastic resin. Further, according to some embodiments, the inorganic fillers may be present in an amount of from about any of the foregoing amounts to about any other of the foregoing amounts.

Within this range, the thermoplastic resin composition can have good properties in terms of impact resistance, rigidity, surface hardness, and/or appearance.

The thermoplastic resin composition may further include one or more than one of any typical additives commonly used in thermoplastic resin compositions without deteriorating the effects of the present invention, as needed. Examples of the additives may include lubricants, colorants, antistatic agents, and/or flame retardants, without being limited thereto. The additives may be present in an amount of 0.01 parts by weight to 20 parts by weight relative to about 100 parts by weight of the base resin.

The thermoplastic resin composition may be prepared in pellet form by mixing the aforementioned components, followed by melt extrusion using a typical twin-screw extruder at about 200° C. to about 300° C., for example, about 250° C. to about 280° C.

The thermoplastic resin composition may allow about 90 grid-lattices or more, for example, about 92 to about 100 grid lattices, to remain without being peeled off when a tape is attached to and is then detached from an injection-molded specimen having a size of 50 mm×90 mm×3.2 mm after aging the specimen at 25° C. for 6 hours, activating a surface of the specimen in stripe form through laser direct structuring, forming a 35 μm thick copper layer on the activated surface of the specimen through plating (copper electroless plating), leaving the specimen in a chamber under conditions of 85° C. and 85% RH for 72 hours, and carving 100 grid-lattices each having a size of 1 mm×1 mm on the plating layer (copper layer).

The thermoplastic resin composition may have a color variation (ΔE) of about 4 or less, for example, about 0.1 to about 3, as calculated according to Equation 1:

$$\text{Color variation } (\Delta E) = \sqrt{(\Delta L^*)^2 + (\Delta a^*)^2 + (\Delta b^*)^2} \quad \text{[Equation 1]},$$

wherein $\Delta L^*$ is a difference ($L_1^* - L_0^*$) between $L^*$ values before/after exposure; $\Delta a^*$ is a difference ($a_1^* - a_0^*$) between $a^*$ values before/after exposure; and $\Delta b^*$ is a difference ($b_1^* - b_0^*$) between $b^*$ values before/after exposure, in which $L_0^*$, $a_0^*$ and $b_0^*$ are initial color values, as measured on an injection molded specimen having a size of 50 mm×90 mm×3.2 mm using a color difference meter, and $L_1^*$, $a_1^*$ and $b_1^*$ are color values, as measured on the specimen by the same method after exposure under conditions of 280° C. for 10 minutes.

The thermoplastic composition may have injection molding stability measured by counting the number of specimens (out of 10 specimens) generating silver streaks around a gate thereof upon continuous injection molding of the 10 specimens (specimens having a size of 50 mm×90 mm×3.2 mm produced using a 6 oz. injection molding machine; molding temperature: 300° C., mold temperature: 60° C.). For example, the thermoplastic resin composition of this disclosure can have a reduced number of specimens with silver streaks, for example, 0 specimens, and in some embodiments 0, 1, 2, and/or 3 specimens, out of 10 specimens continuously injection molded as noted herein.

A molded article formed of the thermoplastic resin composition as set forth above is also provided. For example, the molded article may be prepared by any suitable molding method, such as injection molding, compression molding, blow molding, extrusion molding, and the like using the thermoplastic resin composition. The molded article can be easily formed by a person having ordinary skill in the art.

Figure 1:
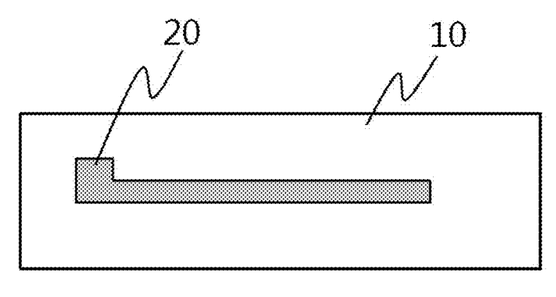
FIG. 1 is a schematic view of a molded article according to one embodiment of the present invention.

FIG. 1 is a schematic view of a molded article according to one embodiment of the present invention. It should be noted that the drawing is exaggerated in thickness of lines or size of components for descriptive convenience and clarity only. Referring to FIG. 1, a molded article 10 according to this embodiment may include a metal layer 20 formed on at least a portion of a surface thereof through LDS and plating. The molded article 10 according to the embodiment may be a circuit carrier used in manufacture of antennas. For example, the molded article 10 may be manufactured by preparing a preform 10 through injection molding using the thermoplastic resin composition and irradiating a specific region (a portion to be formed with the metal layer 20) on the surface of the preform 10 with laser beams, followed by metallization (plating) of the irradiated region to form the metal layer 20.

In exemplary embodiments, the LDS additive included in the preform 10 is decomposed to form metal nuclei upon irradiation with laser beams. In addition, the laser beam-irradiated region can have a suitable surface roughness for plating. Here, the laser beams may have a wavelength of about 248 nm, about 308 nm, about 355 nm, about 532 nm, about 1,064 nm, or about 10,600 nm.

The metallization may be performed by any typical plating process. For example, the metallization may include dipping the laser beam-irradiated preform 10 in at least one electroless plating bath to form the metal layer 20 (electrically conductive path) on the laser beam-irradiated region of the surface of the preform 10. Here, examples of the electroless plating may include copper plating, gold plating, nickel plating, silver plating, zinc plating, and/or tin plating.

The molded article having the metal layer formed on at least a portion of the surface thereof by LDS can be easily manufactured by those skilled in the art.

Next, the present invention will be described in more detail with reference to the following examples. It should be understood that these examples are provided for illustration only and are not to be in any way construed as limiting the present invention.

EXAMPLE

Details of components used in Examples and Comparative Examples are as follows:

(A) Thermoplastic Resin (A1) Polycarbonate Resin

A bisphenol-A polycarbonate resin (Lotte Advanced Materials Co., Ltd.) having a weight average molecular weight of 23,000 g/mol is used.

(A2) Rubber-Modified Aromatic Vinyl-Based Resin

An acrylonitrile-butadiene-styrene copolymer (ABS) resin (ABS ER400, LG Chemical Co., Ltd.) is used.

(A3) Polyester Resin

A glycol-modified polyester resin (Skygreen® S2008, SK Chemicals Co., Ltd.) is used.

(B) LDS Additive

Copper hydroxide phosphate (Iriotec® 8840, Merck Performance Materials Co., Ltd.) is used.

(C) Hindered Phenol-Based Compound

Pentaerythritol tetrakis(3,5-di-t-butyl-4-hydroxy-hydrocinnamate) (Irganox® 1010, BASF) is used.

(D) Sodium Phosphate Salt

Disodium pyrophosphate (Innophos Co., Ltd.) is used.

(E) Phosphite Compound

Tris(2,4-di-tert-butylphenyl) phosphite (ADK STAB PEP-36, ADEKA) is used.

(F) Sulfonate Compound

Potassium diphenyl sulfone-3-sulfonate (Seal Sands Chemicals Co., Ltd.) is used.

(G) Metal Oxide

Magnesium oxide (Kyowa MAG 150, Kyowa Chemical Co., Ltd.) is used.

(H) Inorganic Filler

Glass fibers (CSG 3PA-832, Nittobo Co., Ltd.) are used.

Examples 1 to 4 and Comparative Examples 1 to 5

The aforementioned components are mixed in amounts as listed in Table 1, followed by melt extrusion at a barrel temperature of 250° C. to 300° C. using a twin-screw extruder (L/D=36, φ45 mm), thereby preparing a thermoplastic resin composition in pellet form. The prepared pellets are dried at 80° C. to 100° C. for 4 hours or more, followed by injection molding using a 6 oz. injection molding machine (molding temperature: 300° C., mold temperature: 60° C.), thereby preparing specimens. The prepared specimens are evaluated as to the following properties and results are shown in Table 1.

Property Evaluation (1) Plating reliability: An injection-molded specimen (prepared as noted herein using a 6 oz. injection molding machine; molding temperature: 300° C., mold temperature: 60° C.) having a size of 50 mm×90 mm×3.2 mm is subjected to aging at 25° C. for 6 hours, followed by activating a surface of the specimen in stripe form through laser direct structuring. Then, a 35 μm thick copper layer is formed on the activated surface of the specimen through plating (copper electroless plating) and left in a chamber under conditions of 85° C. and 85% RH for 72 hours, followed by carving 100 grid-lattices each having a size of 1 mm×1 mm on the plating layer (copper layer). Then, a tape is attached to the plating layer and plating reliability is evaluated based on the number of grid-lattices remaining on the plating layer upon detachment of the tape from the plating layer.

(2) Injection molding stability: The number of specimens generating silver streaks around a gate thereof is counted upon continuous injection molding of 10 specimens (specimens having a size of 50 mm×90 mm×3.2 mm produced using a 6 oz. injection molding machine; molding temperature: 300° C., mold temperature: 60° C. as noted herein).

(3) Thermal stability: Initial color values ($L_0^*$, $a_0^*$, $b_0^*$) are measured on an injection molded specimen (prepared as noted herein using a 6 oz. injection molding machine; molding temperature: 300° C., mold temperature: 60° C.) having a size of 50 mm×90 mm×3.2 mm using a color difference meter (CM-3700A, Konica Minolta Co., Ltd.) and $L_1^*$, $a_1^*$ and $b_1^*$ are measured on the specimen by the same method after exposure under conditions of 280° C. for 10 minutes. Then, a color variation ($\Delta E$) is calculated according to Equation 1:

$$\text{Color variation } (\Delta E) = \sqrt{(\Delta L^*)^2 + (\Delta a^*)^2 + (\Delta b^*)^2} \quad \text{[Equation 1]},$$

where $\Delta L^*$ is a difference ($L_1^* - L_0^*$) between L* values before/after exposure; $\Delta a^*$ is a difference ($a_1^* - a_0^*$) between a* values before/after exposure; and $\Delta b^*$ is a difference ($b_1^* - b_0^*$) between b* values before/after exposure.

TABLE 1

| | | Example | | | | Comparative Example | | | | |
|---|---|---|---|---|---|---|---|---|---|---|
| | | 1 | 2 | 3 | 4 | 1 | 2 | 3 | 4 | 5 |
| (A) (wt %) | (A1) | 100 | 100 | 80 | 80 | 100 | 100 | 100 | 100 | 100 |
| | (A2) | — | — | 20 | — | — | — | — | — | — |
| | (A3) | — | — | — | 20 | — | — | — | — | — |
| (B) (parts by weight) | | 10 | 10 | 10 | 10 | 10 | 10 | 10 | 10 | 10 |
| (C) (parts by weight) | | 0.5 | 0.5 | 0.5 | 0.5 | — | 0.5 | 0.5 | 0.5 | 0.5 |
| (D) (parts by weight) | | 1 | 1 | 1 | 1 | 1 | — | 1 | 1 | 1 |
| (E) (parts by weight) | | 0.5 | 0.5 | 0.5 | 0.5 | 0.5 | 0.5 | — | 0.5 | 0.5 |
| (F) (parts by weight) | | 0.5 | 0.5 | 0.5 | 0.5 | 0.5 | 0.5 | 0.5 | — | 0.5 |
| (G) (parts by weight) | | 0.5 | 0.5 | 0.5 | 0.5 | 0.5 | 0.5 | 0.5 | 0.5 | — |
| (H) (parts by weight) | | — | 20 | — | — | — | — | — | — | — |
| The number of remaining grid-lattices | | 95 | 92 | 96 | 98 | 88 | 45 | 86 | 42 | 88 |
| The number of specimens causing gas generation | | 0 | 0 | 0 | 0 | 7 | 8 | 5 | 7 | 0 |
| Color variation ($\Delta E$) | | 2.0 | 1.7 | 2.2 | 2.5 | 5.8 | 8.5 | 5.4 | 9.7 | 11.2 |

Parts by weight: parts by weight relative to 100 parts by weight of thermoplastic resin (A)

From Table 1, it can be seen that the thermoplastic resin compositions according to embodiments of the present invention have good properties in terms of plating reliability, injection molding stability and thermal stability.

In contrast, it can be seen that the thermoplastic resin composition of Comparative Example 1 prepared without using the hindered phenol-based compound (C) suffers from deterioration in thermal stability and injection molding stability by generating gas silver marks on the injection molded specimen. In addition, the thermoplastic resin composition of Comparative Example 2 prepared without using the sodium phosphate salt (D) suffers from deterioration in plating reliability, thermal stability and injection molding stability; the thermoplastic resin composition of Comparative Example 3 prepared without using the phosphite compound (E) suffers from deterioration in thermal stability and injection molding stability; the thermoplastic resin composition of Comparative Example 4 prepared without using the sulfonate compound (F) suffers from deterioration in plating reliability, thermal stability and injection molding stability; and the thermoplastic resin composition of Comparative Example 5 prepared without using the metal oxide (G) suffers from significant deterioration in thermal stability.

It is within the scope of this disclosure for one or more of the terms "substantially," "about," "approximately," and/or the like, to qualify each adjective and adverbs of the foregoing disclosure, to provide a broad disclosure. As an example, it is believed those of ordinary skill in the art will readily understand that, in different implementations of the features of this disclosure, reasonably different engineering tolerances, precision, and/or accuracy may be applicable and suitable for obtaining the desired result. Accordingly, it is believed those of ordinary skill will readily understand usage herein of the terms such as "substantially," "about," "approximately," and the like.

The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

Exemplary embodiments have been disclosed herein, and although specific terms are employed, they are to be interpreted in a generic and descriptive sense only and not for purpose of limitation. Also although some embodiments have been described above, it should be understood that these embodiments are provided for illustration only and are not to be construed in any way as limiting the present invention, and that various modifications, changes, alterations, and equivalent embodiments can be made by those skilled in the art without departing from the spirit and scope of the invention. The scope of the present invention should be defined by the appended claims and equivalents thereof.

What is claimed is:
1. A thermoplastic resin composition comprising:
   about 100 parts by weight of a thermoplastic resin;
   about 1 to about 30 parts by weight of an additive for laser direct structuring (LDS) additive;
   about 0.01 to about 5 parts by weight of a hindered phenol-based compound;

about 0.01 to about 10 parts by weight of a sodium phosphate salt;

about 0.01 to about 5 parts by weight of a phosphite compound;

about 0.01 to about 5 parts by weight of a sulfonate compound; and about 0.01 to about 10 parts by weight of a metal oxide, wherein a weight ratio of the hindered phenol-based compound, the sodium phosphate salt, the phosphite compound and the sulfonate compound to the metal oxide ranges from about 2:1 to about 10:1.

2. The thermoplastic resin composition according to claim 1, wherein the thermoplastic resin comprises a polycarbonate resin, a rubber-modified aromatic vinyl-based resin, a polyester resin, a polyamide resin, and/or a polyarylene ether resin.

3. The thermoplastic resin composition according to claim 1, wherein the LDS additive comprises a heavy metal composite oxide spinel and/or a copper salt.

4. The thermoplastic resin composition according to claim 1, wherein the metal oxide comprises magnesium oxide, zinc oxide, calcium oxide, and/or aluminum oxide.

5. The thermoplastic resin composition according to claim 1, further comprising: inorganic fillers.

6. The thermoplastic resin composition according to claim 5, wherein the inorganic fillers comprise glass fibers, talc, wollastonite, whisker, silica, mica, and/or basalt fibers.

7. The thermoplastic resin composition according to claim 1, wherein the thermoplastic resin composition allows about 90 grid-lattices or more to remain without being peeled off when a tape is attached to and is then detached from an injection-molded specimen having a size of 50 mm×90 mm×3.2 mm after aging the specimen at 25° C. for 6 hours, activating a surface of the specimen in stripe form through laser direct structuring, forming a 35 nm thick copper layer on the activated surface of the specimen through plating (copper electroless plating), leaving the specimen in a chamber under conditions of 85° C. and 85% RH for 72 hours, and carving 100 grid-lattices each having a size of 1 mm×1 mm on the plating layer (copper layer).

8. The thermoplastic resin composition according to claim 1, wherein the thermoplastic resin composition has a color variation ($\Delta E$) of about 4 or less, as calculated according to Equation 1:

$$\text{Color variation } (\Delta E) = \sqrt{(\Delta L^*)^2 + (\Delta a^*)^2 + (\Delta b^*)^2} \quad \text{[Equation 1]}$$

where $\Delta L^*$ is a difference ($L_1^* - L_0^*$) between $L^*$ values before/after exposure; $\Delta a^*$ is a difference ($a_1^* - a_0^*$) between $a^*$ values before/after exposure; and $\Delta b^*$ is a difference ($b_1^* - b_0^*$) between $b^*$ values before/after exposure, in which $L_0^*$, $a_0^*$ and $b_0^*$ are initial color values, as measured on an injection molded specimen having a size of 50 mm×90 mm×3.2 mm using a color difference meter, and $L_1^*$, $a_1^*$ and $b_1^*$ are color values, as measured on the specimen by the same method after exposure under conditions of 280° C. for 10 minutes.

9. A molded article formed of the thermoplastic resin composition according to claim 1.

10. The molded article according to claim 9, comprising: a metal layer formed on at least a portion of a surface thereof through laser direct structuring and plating.

* * * * *